(12) United States Patent
Furuta

(10) Patent No.: US 8,618,945 B2
(45) Date of Patent: Dec. 31, 2013

(54) IN-VEHICLE COMMUNICATION SYSTEM AND IN-VEHICLE APPARATUS

(75) Inventor: Seiichi Furuta, Anjo (JP)

(73) Assignee: DENSO CORPORATION, Kariay (JP)

( * ) Notice: Subject to any disclaimer, the term of this patent is extended or adjusted under 35 U.S.C. 154(b) by 307 days.

(21) Appl. No.: 13/084,605

(22) Filed: Apr. 12, 2011

(65) Prior Publication Data

US 2011/0254692 A1     Oct. 20, 2011

(30) Foreign Application Priority Data

Apr. 14, 2010   (JP) .................................. 2010-93203

(51) Int. Cl.
*G08B 21/00*       (2006.01)

(52) U.S. Cl.
USPC .................. 340/636.1; 340/636.11; 340/988; 340/539.3; 340/693.1; 340/995.13; 340/995.19; 340/995.23; 455/412.2; 455/572; 455/569.2; 713/171

(58) Field of Classification Search
USPC ....................... 340/988, 539.93, 693.1–693.4, 340/636.1–636.21, 995.19, 995.23, 995.13; 455/569.2, 412.2, 572; 713/171; 701/410, 468
See application file for complete search history.

(56) References Cited

U.S. PATENT DOCUMENTS

| | | | |
|---|---|---|---|
| 6,323,775 B1* | 11/2001 | Hansson | 340/636.1 |
| 7,109,876 B2* | 9/2006 | Smith et al. | 340/636.1 |
| 7,395,097 B2* | 7/2008 | Perdomo et al. | 455/574 |
| 2002/0032048 A1 | 3/2002 | Kitao et al. | |
| 2006/0121951 A1* | 6/2006 | Perdomo et al. | 455/572 |
| 2007/0178838 A1 | 8/2007 | Matsuda | |
| 2009/0082957 A1 | 3/2009 | Agassi et al. | |
| 2010/0037057 A1* | 2/2010 | Shim et al. | 713/171 |
| 2010/0094496 A1 | 4/2010 | Hershkovitz et al. | |
| 2010/0144400 A1* | 6/2010 | Azuma | 455/569.2 |
| 2011/0270518 A1* | 11/2011 | Nguyen | 701/201 |
| 2012/0049787 A1* | 3/2012 | Kuroiwa | 320/106 |
| 2013/0162430 A1* | 6/2013 | Scherzer et al. | 340/539.13 |

FOREIGN PATENT DOCUMENTS

| | | | |
|---|---|---|---|
| JP | A-2001-257781 | 9/2001 | |
| JP | A-2009-042161 | 2/2009 | |
| JP | 2009-092428 A | 4/2009 | |
| JP | A-2009-204590 | 9/2009 | |
| JP | 2009204590 * | 10/2009 | H04W 4/02 |
| WO | WO 2009088835 A2 * | 7/2009 | G07C 9/00 |

OTHER PUBLICATIONS

Office Action dated Nov. 27, 2012 issued from the Japanese Patent Office for the JP counterpart application No. 2010-093203 (English translation enclosed).
Office Action mailed Apr. 16, 2013 in corresponding JP Application No. 2010-093203 (and English translation).

* cited by examiner

*Primary Examiner* — Benjamin C Lee
*Assistant Examiner* — Chico A Foxx
(74) *Attorney, Agent, or Firm* — Posz Law Group, PLC

(57) ABSTRACT

An in-vehicle communication system is disclosed. The in-vehicle communication system is configured to connect a short range wireless communication link between an in-vehicle apparatus and a portable device, and predicts a battery level threshold reach time, which is a time when a battery level of a battery of the portable device reaches below a threshold. When it is determined that the battery level threshold reach time is prior to a vehicle travel end time, the in-vehicle communication system notifies the passenger of prompt battery charge information to prompt the passenger to charge the battery of the portable device.

13 Claims, 5 Drawing Sheets

IN-VEHICLE COMMUNICATION SYSTEM AND IN-VEHICLE APPARATUS

CROSS REFERENCE TO RELATED APPLICATION

The present application is based on and claims priority to Japanese Patent Application No. 2010-93203 filed on Apr. 14, 2010, disclosure of which is incorporated herein by reference.

BACKGROUND

1. Technical Field

The present invention relates to an in-vehicle communication system that is configured to connect a short range wireless communication link between an in-vehicle apparatus and a portable device so that the short range wireless communication link enables a passenger to control the portable device by manipulating the in-vehicle apparatus. The present invention also relates to an in-vehicle apparatus usable in the in-vehicle communication system.

2. Description of Related Art

For example, Patent Document 1 discloses a system configured to automatically establish a short range wireless communication link between an in-vehicle apparatus mounted to a vehicle and a portable device capable of being carried by a passenger when the portable device is carried into a vehicle compartment of the vehicle, and when the in-vehicle apparatus and the portable device are within a wireless communication range (i.e., a range that allows the in-vehicle apparatus and the portable device to communicate with each other).

Patent Document 1: JP-2002-193046A corresponding to US/20020032048A

In a system like the above system, an in-vehicle apparatus and a portable device can cooperate with each other by establishing a short range wireless communication link therebetween, so that a passenger can control an operation of the portable device by manipulating the in-vehicle apparatus. For example, when a phone book data (e.g., phone book list) is transferred from the portable device to the in-vehicle apparatus and the phone book list is displayed on a display device of the in-vehicle apparatus, a passenger can search for a certain phone number by manipulating the phone number list displayed on the display device of the in-vehicle apparatus. Moreover, the passenger can make a phone call from the portable device by pressing an outgoing call button that is formed on the display device of the in-vehicle apparatus as a touch sensitive switch.

In this relation, while the portable device and the in-vehicle apparatus are being connected with each other via the short range wireless communication link, each of the portable device and the in-vehicle apparatus keeps consuming an electric power due to the connection of the short range wireless communication link even if there is no passenger's manipulation on the portable device or the in-vehicle apparatus. In this relation, the electric power consumption of the in-vehicle apparatus caused by the short range wireless communication link involves no disadvantage since the in-vehicle apparatus operates on an electric power supplied from a vehicle battery mounted to the vehicle. In contrast, since the portable device operates on an electric power supplied from its detachable battery, a battery level of the portable device keeps deceasing when the portable device has the short range wireless communication link with the in-vehicle apparatus.

If the portable device is put in, for example, a passenger's pocket of a jacket or a bag, the passenger cannot recognize the battery level (i.e., reaming battery level). As a result, when the portable device and the in-vehicle apparatus are connected with each other via a short range wireless communication link, the battery level decreases to below a threshold to make the portable device unusable. In this case, the passenger may become aware that the portable device is unusable only when the passenger gets out of the vehicle. In particular, since the system is configured to enable a passenger to control the portable device by manipulating the in-vehicle apparatus, it is conceivable that the passenger may rarely manipulate the portable device. Thus, it is difficult for the passenger to be aware of the decrease in battery level of the portable device.

SUMMARY

In view of the foregoing, an objective relating to the present invention is to provide an in-vehicle communication system and an in-vehicle apparatus that can appropriately notify a passenger of information about a battery remaining level of a battery of a portable device, and that can enhance usability.

According to a first aspect, there is provided an in-vehicle communication system that is configured to connect a short range wireless communication link between an in-vehicle apparatus mounted to a vehicle and a portable device capable of being carried by a passenger of the vehicle. The short range wireless communication link enables the passenger to control an operation of the portable device by manipulating the in-vehicle apparatus. The in-vehicle communication system is further configured to predict a battery level threshold reach time based on a state of the portable device and a battery level of a battery serving as a power source of the portable device. In the above, the battery level threshold reach time is a time at which the battery level of the battery reaches below a threshold. The in-vehicle communication system is further configured to predict a travel end time, which is a time at which the vehicle ends traveling. The in-vehicle communication system is further configured to cause a notifier device to notify the passenger of prompt battery charge information when the predicted battery level threshold reach time is prior to the predicted travel end time. In the above, the prompt battery charge information is information that prompts the passenger to charge the battery.

According to a second aspect, there is provided an in-vehicle apparatus that is mountable to a vehicle and usable in an in-vehicle communication system in which the in-vehicle apparatus and a portable device capable of being carried by a passenger are connectable with each other via a short range wireless communication link. The short range wireless communication link enables the passenger to control an operation of the portable device by manipulating the in-vehicle apparatus. The in-vehicle apparatus is configured to receive information on a state of the portable device and a battery level of a battery serving as a power source of the portable device, when the information is transmitted from the portable device. The in-vehicle apparatus is further configured to predict a battery level threshold reach time based on the received information on the state of the portable device and the battery level of the battery. In the above, the battery level threshold reach time is a time at which the battery level of the battery reaches below a threshold. The in-vehicle apparatus is further configured to predict a travel end time, which is a time at which the vehicle ends traveling. The in-vehicle apparatus is further configured to cause a notifier device to notify the passenger of prompt battery charge information when the predicted battery level threshold reach time is prior to the predicted travel end time. In the above, the prompt battery charge information is information that prompts the passenger to charge the battery.

According the above in-vehicle communication system and the above in-vehicle apparatus, it is possible to appropriately notify a passenger of information about a battery remaining level of a battery of a portable device. It is possible to enhance usability.

BRIEF DESCRIPTION OF THE DRAWINGS

The above and other objects, features and advantages relating to the present invention will become more apparent from the following detailed description made with reference to the accompanying drawings. In the drawings.

DETAILED DESCRIPTION OF EMBODIMENTS

Embodiments will be described with reference to the accompanying drawings.

Figure 2:
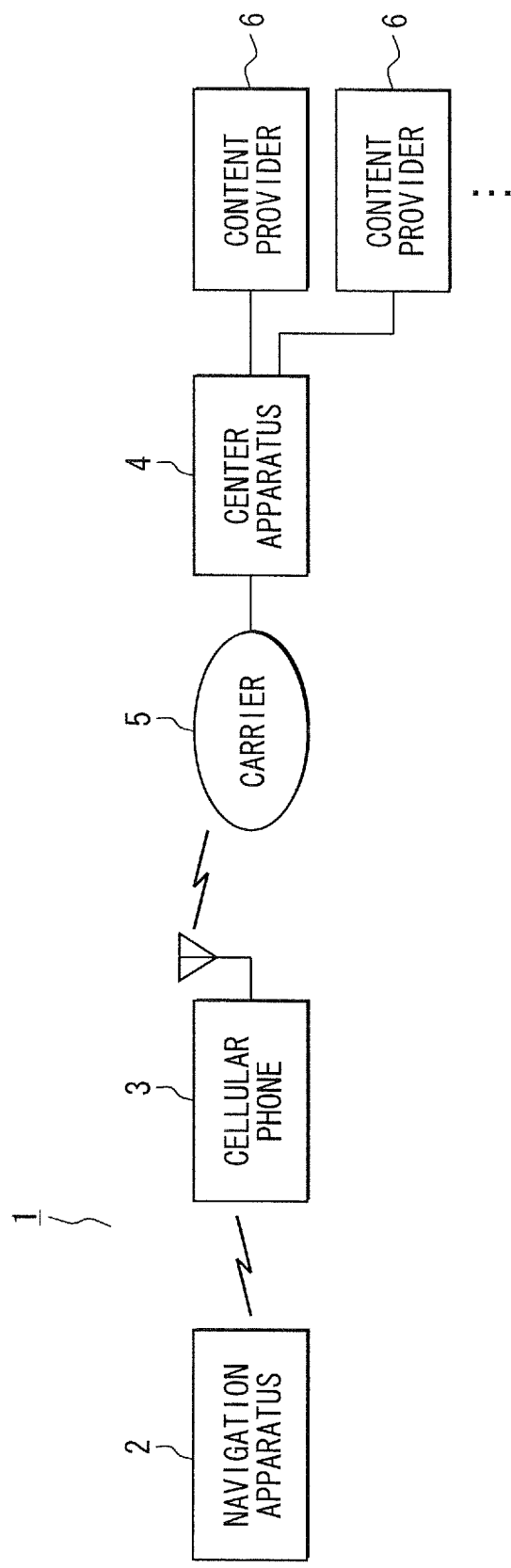
FIG. 2 is a diagram illustrating a communication system.

FIG. 2 illustrates an in-vehicle communication system 1. The in-vehicle communication system 1 includes a vehicle navigation apparatus 2 and a cellular phone 3. The vehicle navigation apparatus 2 supports and has a Bluetooth (registered trademark) communication function. For simplicity, Bluetooth is abbreviated to herein as BT. The vehicle navigation apparatus 2 is mounted to a vehicle and can act as an in-vehicle apparatus. The cellular phone 3 supports and has a BT communication function, and can act as a portable device. When the cellular phone 3 is carried into the vehicle, the vehicle navigation apparatus 2 and the cellular phone 3 becomes communicatable with each other.

In a state where the vehicle navigation apparatus 2 and the cellular phone 3 have a BT communication link therebetween, the vehicle navigation apparatus 2 and the cellular phone 3 are connectable with each other using one or more of multiple profiles defined in BT communications standards, e.g., a dial-up networking profile (DUP), a serial port profile (SPP) etc. The vehicle navigation apparatus 2 and the cellular phone 3 may be connected to each other simultaneously using multiple profiles (i.e., what is called a multi-profile connection). In the above, the profiles mean communication protocols that are defined on a function-by-function basis.

The cellular phone 3 is connectable with a center apparatus 4, which is provided in a center, via a wide area communication link through a communications carrier 5 (abbreviated to herein as a carrier 5). When the cellular phone 3 has the wide area communication link with the center apparatus 4, the cellular phone 3 can perform wide area communications with the center apparatus 4. The center apparatus 4 is connected with multiple content service providers 6. When the center apparatus 4 has the wide communication link with the cellular phone 3, the center apparatus 4 can distribute content, which is provided from the content service providers 6, to the cellular phone 3 through the carrier 5 by the wide area communications. The content provided from the content service providers 6 may be, for example, news information, traffic information, weather information, travel information, map information, music information, entertainment information, or the like.

Figure 1:
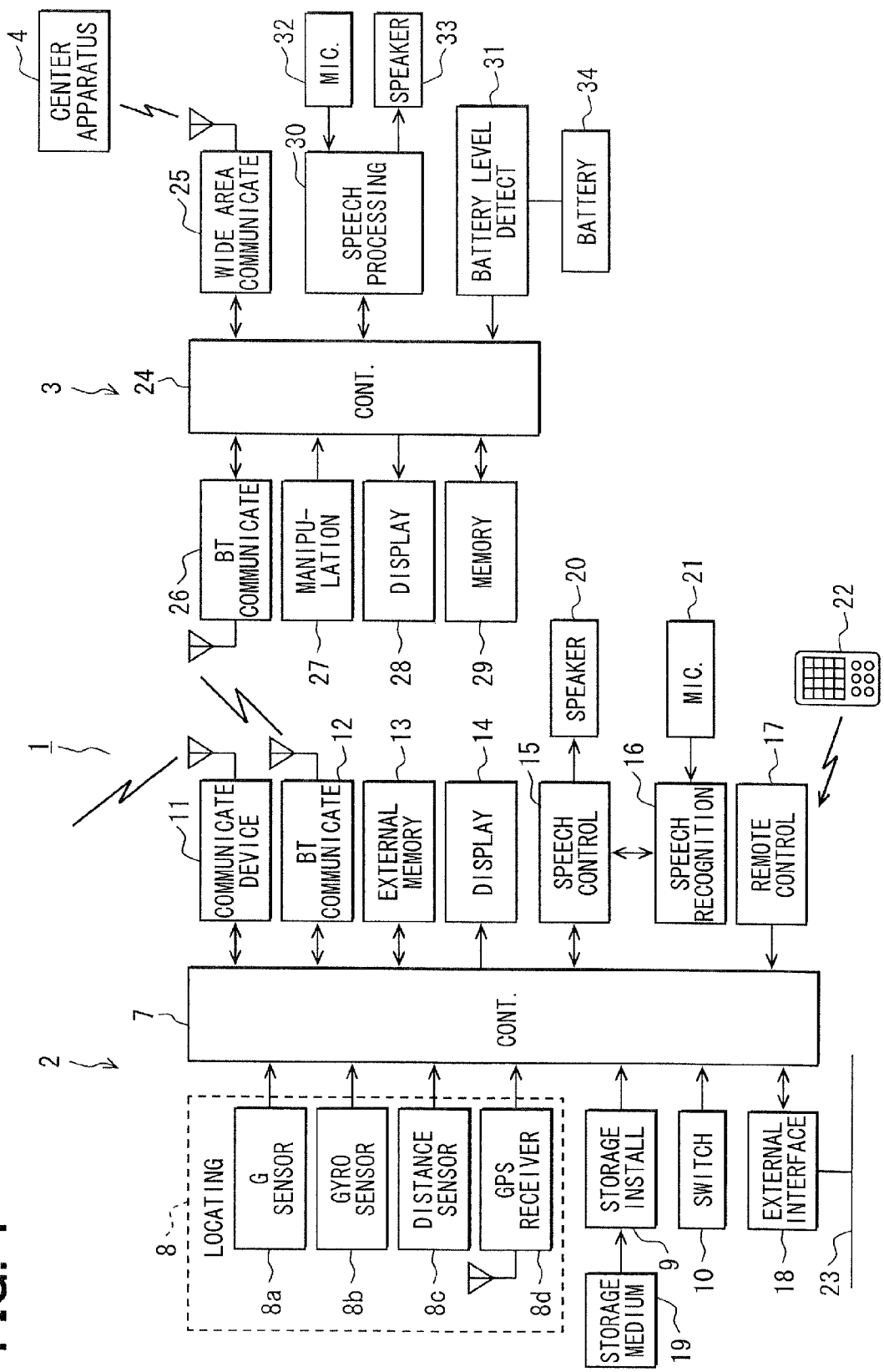
FIG. 1 is a functional block diagram illustrating a vehicle navigation apparatus and a cellular phone according to one embodiment.

FIG. 1 is a functional block diagram illustrating the vehicle navigation apparatus 2 and the cellular phone 3. The vehicle navigation apparatus 2 includes a controller 7, a locating device 8, a storage medium installation part 9, a group of operation switches 10, a communication device 11, a BT communication part 12, an external memory 13, a display device 14, a speech controller 15, a speech recognition part 16, a remote control sensor 17, and an external device interface 18.

The controller 7, which may have a known a microcomputer, includes a CPU (central processing unit), a RAM (random access memory), and an I/O bus (input/output bus) etc. The controller 7 controls generally all of operations of the vehicle navigation apparatus 2 by executing control programs. The locating device 8 includes a G sensor 8a, a gyroscope 8b, a distance sensor 8c, and a GPS (global positioning system) receiver 8d. These components output detection signals and have detection errors that are different in property from each other. The controller 7 detects and identifies present position of the vehicle while compensating the detection signals each other. In connection with this, as long as the locating device 8 can detect the present position of the vehicle with a required detection accuracy, the locating device 8 needs not to include all of the above components. Further, the locating device 8 may detect the present position of the vehicle in cooperation with a steering wheel sensor for detecting steering angle of a steering wheel, a tire wheel sensor for detecting rotation of each tire wheel, or the like.

The storage medium installation part 9 installs a storage medium 19 such as a CD-ROM, a DVD-ROM, a memory card, a HDD and the like. The storage medium 19 stores map data, road data, mark data, data for map matching, or the like. The group of operation switches 10 includes a mechanical switch arranged in a periphery of the display device 14, and a touch-sensitive switch provided on the display device 14. In response to passenger's manipulation on any one of the switches, the group of operation switches 10 outputs a manipulation detection signal indicating content of the passenger's manipulation to the controller 7.

The communication device 11 performs wide area communication, e.g., receiving VICS (registered trade mark) information transmitted from a VICS apparatus. The VICS is abbreviation of Vehicle Information and Communication System. The BT communication part 12 can be connected with the cellular phone 3 via a BT communication link. When having the BT communication link, the BT communication part 12 can perform BT communication with the cellular phone 3. The external memory 13 includes a large-capacity storage device such as a HDD and the like, which can store a large amount of data. The display device 14 includes, for example, a liquid crystal display. The display device 14 presents various displays such as a menu screen, a destination setting screen and the like. The display device 14 superimposes a present position mark indicating the present position of the vehicle, a vehicular swept path or the like on a map based on the map data. The display device 14 may include an organic light emitting display, a plasma display or the like.

The speech controller 15 controls an operation of the speech recognition part 16, and controls a speech output from a speaker 20 such as route guidance, a warning guidance and the like. The speech recognition part 16 performs speech recognition on speech received with a microphone 21 according to a speech recognition algorithm. The remote control sensor 17 receives a manipulation detection signal transmitted from the remote control 22 to detect content of a passenger's manipulation on the remote control 22. The remote control sensor 17 outputs a manipulation detection signal indicting the content of the manipulation to the controller 7.

The external device interface 18 is connected with various on-board ECUs (electronic control unit) and various on-board sensors via an in-vehicle LAN 23. Various signals and various data are inputted and outputted between the external device interface 18 and the various ECUs, and between the external device interface 18 and the various sensors.

The controller 7 implements various navigation functions, e.g., a map matching function, a route retrieval function, a route guidance function, and a drawing function etc. The map matching function is provided to identify a road on which the present position of the vehicle exists, by using the present position of the vehicle and the road data of the map data. The route retrieval function is provided to retrieve a route from the present position of the vehicle, which may be identified by the map matching function, to a destination, which may be set by the passenger. The route guidance function is provided to perform route guidance by calculating guidance points based on the retrieved route, the road data, intersection position data and the like. In the above, the guidance points are points needed for the route guidance, and the road data and the intersection position data are contained in the map data. The drawing function is provided draw a map around the present position of the vehicle, a simplified map of expressways, a magnified view of an intersection and its surroundings, and the like.

The cellular phone 3 includes a controller 24, a wide area communication part 25, a BT communication part 26, a manipulation part 27, a display device 28, a memory 29, a speech processing part 30, and a battery level detector 31 (also called a battery remaining level detector). The controller 24, which may have a known microcomputer, includes a CPU, a RAM, a ROM, an I/O bus and the like. The controller 24 controls generally all of operations of the cellular phone 3 by executing control programs. The wide area communication part 25 can be connected with a center apparatus 4 via a wide area communication link. When having the wide area communication link, the wide area communication part 25 performs wide area communication with the center apparatus 4. The BT communication part 26 can be connected with the vehicle navigation apparatus 2 via a BT communication link. When having the BT communication link, the BT communication part 26 performs the BT communication with the vehicle navigation apparatus 2.

The manipulation part 27 includes various keys such as a power key, numerical keys "1" to "9", and the like. In response to passenger's manipulation on any one of the keys, the manipulation part 27 outputs a manipulation detection signal indicating content of the manipulation to the controller 24. The display device 28 includes, for example, a liquid crystal display. The display device 28 presents various displays such as a standby display, an incoming notification display and the like. The memory 29 has a data storage area for storing various data, e.g., a phone book data representing a relationship between phone numbers and registered names. The memory 29 further includes another data storage area for storing various contents that the wide area communication part 25 has received from the center apparatus 4.

The speech processing part 30 is connected with a microphone 32 and a speaker 33. The microphone 32 can receive a user spoken speech as an outgoing speech. The speaker 33 can output an incoming speech coming from a conversation counterpart. The speech processing part 30 performs an outgoing speech operation through processing on the user spoken speech inputted from the microphone 32. The speech processing part 30 further performs an incoming speech operation through processing on the incoming speech, which is to be outputted from the speaker 33. The battery level detector 31 detects a battery level (i.e., a remaining battery level) of a battery 34, which serves as a power source for operation of the cellular phone 3. The battery level detector 31 outputs a battery level detection signal indicating the detected battery level of the battery 34 to the controller 24.

The in-vehicle communication system 1 will be more specifically described with reference to FIGS. 3 to 5. When the cellular phone 3 is carried into a vehicle compartment, the vehicle navigation apparatus 2 and the cellular phone 3 are placed in a BT communication range (i.e., a range where the BT communication is workable). In this case, the vehicle navigation apparatus 2 and the cellular phone 3 transmit a BT communication link connection request and a BT communication link connection reply, and perform a BT communication link connection process to connect a BT commutation link therebetween. In the above, the connection of the BT communication link may be requested from either the vehicle navigation apparatus 2 or the cellular phone 3. That is, the vehicle navigation apparatus 2 may transmit the BT communication link connection request and then the cellular phone 3 may transmit the BT communication link connection reply. Alternatively, the cellular phone 3 may transmit the BT communication link connection request and then the vehicle navigation apparatus 2 may transmit the BT communication link connection reply.

The in-vehicle communication system 1 is configured to connect the BT communication link between the vehicle navigation apparatus 2 and the cellular phone 3 such that the BT communication link enables a passenger of the vehicle to control an operation of the cellular phone 3 by manipulating the group of operation switches 10 or the remote control 22 of the vehicle navigation apparatus 2. For example, a phone number list (phone book) registered in the cellular phone 3 may be transferred to the vehicle navigation apparatus 2 and displayed on the display device 14 of the vehicle navigation apparatus 2, so that the passenger can manipulate the phone number list displayed on the display device 14 of the vehicle navigation apparatus 2. Furthermore, a touch-sensitive switch acting as a call button may be provided on the display device 14 of the vehicle navigation apparatus 2, so that the passenger can press the call button on the display device 14 to make a phone call from the cellular phone 3.

Figure 3:
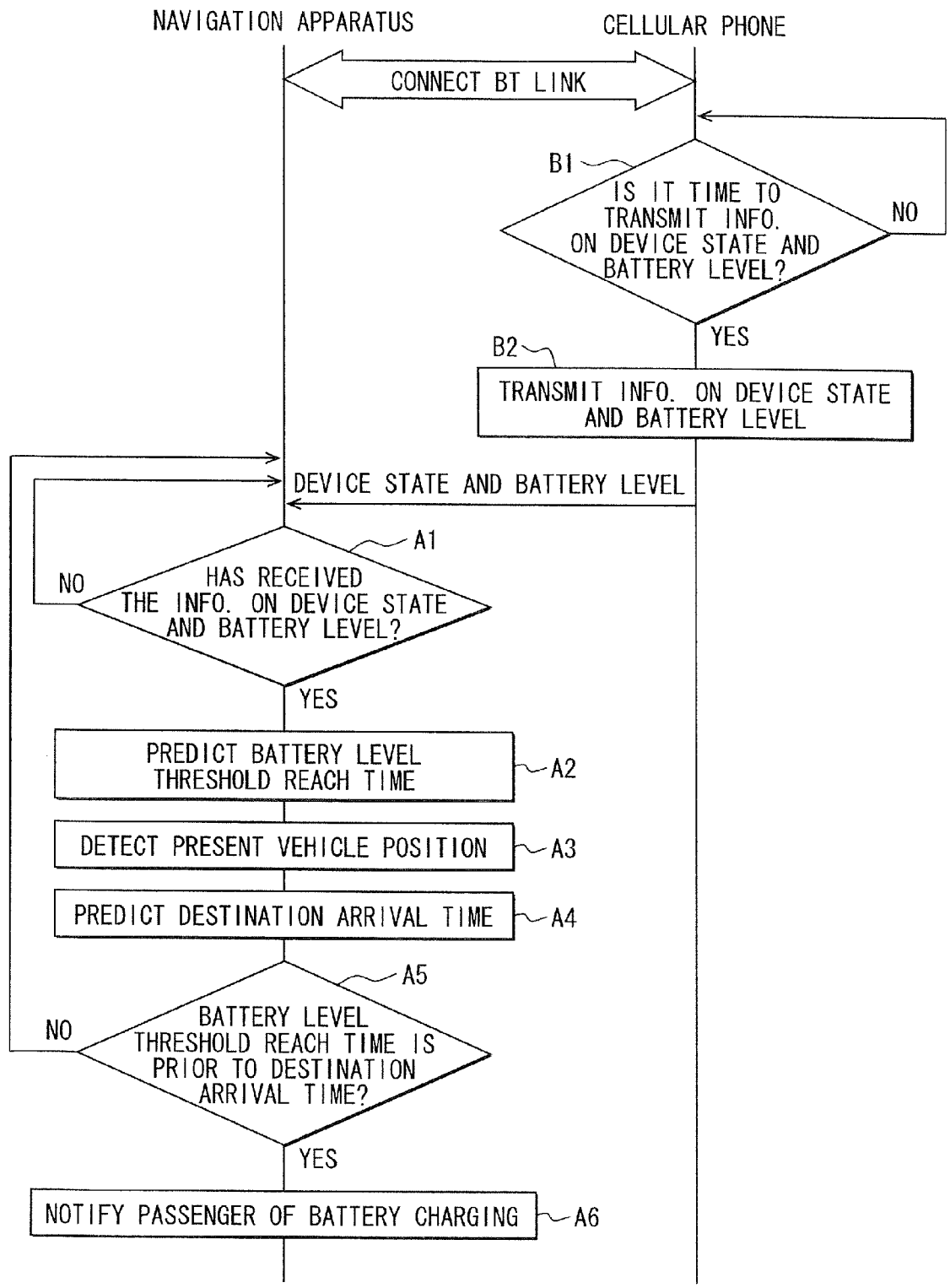
FIG. 3 is a sequence diagram illustrating a first exemplary flow of processes of a vehicle navigation apparatus and a cellular phone.

As shown in FIG. 3, when the BT communication link is established between the BT communication part 12 of the vehicle navigation apparatus 2 and the BT communication part 26 of the cellular phone 3, the cellular phone 3 performs the following. At B1, the controller 24 of the cellular phone 3 determines whether it is time for the cellular phone 3 to transmit information on a device state (e.g., a standby state, a calling state) of the cellular phone 3 and the battery level of the battery 34 of the cellular phone 3, based on predetermine timing of transmitting the information. When the controller 24 determines that it is not time for the cellular phone 3 to transmit the information, corresponding to "NO" at B1, the process B1 is repeated. When the controller 24 determines that it is time for the cellular phone 3 to transmit the information, corresponding to "YES" at B1, the process proceeds to B2. At B2, the controller 24 identifies the device state, and causes the BT communication part 26 to transmit the information on the device state of the cellular phone 3 and the battery level of the cellular phone 3 to the vehicle navigation apparatus 2. In the above, the cellular phone 3 may transmit the information at predetermined time intervals. Alternatively, the cellular phone 3 may transmit the information each time when the device state is changed.

When the BT communication link is established between the BT communication part 12 of the vehicle navigation apparatus 2 and the BT communication part 26 of the cellular phone 3, the vehicle navigation apparatus 2 performs the following, as shown in FIG. 3. At A1, the controller 7 of the vehicle navigation apparatus 2 waits for the BT communication part 12 to receive the information on the device state and the battery level from the cellular phone 3. When the controller 7 determines that the BT communication part 12 has received the information on the device state and the battery level from the cellular phone 3, corresponding to "YES" at A1, the process proceeds to A2. At A2, the controller 7 predicts a battery level threshold reach time based on the received information on the device state and the battery level. In the above, the battery level threshold reach time is a time when the battery level of the battery 34 reaches below a threshold.

At A3, the controller 7 of the vehicle navigation apparatus 2 detects the present position of the vehicle by compensating the detection signals inputted from the components of the locating device 8. At A4, based on the detected present position of the vehicle and the preset destination, the controller 7 of the vehicle navigation apparatus 2 predicts a destination arrival time, which is a time at which the vehicle arrives at the destination. At A5, the controller 7 compares the predicted battery level threshold reach time with the predicted destination arrival time. When the controller 7 determines that the battery level threshold reach time is after the destination arrival time, e.g., when the controller 7 determines that the battery level of the battery 34 of the cellular phone 3 is to stay above the threshold at the time when the vehicle arrives at the destination, the determination "NO" is made at A5. In this case, the controller 7 waits for the BT communication part 12 to again receive the information on the device state and the battery level of the battery from the cellular phone 3.

In contrast, when the controller 7 determines that the battery level threshold reach time is prior to the destination arrival time, e.g., when the controller 7 determines that the battery level of the battery 34 is to reach below the threshold and is to be insufficient at the time when the vehicle arrives at the destination, the determination "YES" is made at A5. In this case, the process proceeds to A6. At A6, the controller 7 causes the display device 14 to display a predetermined display screen or the speaker 20 to output a predetermined voice guidance, thereby notifying the passenger of prompt battery charge information, which prompts the passenger to charge the battery 34. An example is shown in FIG. 5. In FIG. 5, the controller 7 causes the display device 14 to pop up a charge notification window 36 on a present position display screen 35, so that the charge notification window 36 prompts the charging of the battery 34 by indicating, for example, that "battery level of cellular phone is low. Please change the battery". In the above, in the present position display screen 35, a present position mark indicating the present position of the vehicle is superimposed on a map made based on the map data. Alternatively, the controller 7 may pop up the notification window 36 to prompt the charging of the battery 34 even when other display screens are being displayed on the display device 14. For example, the charge notification window 36 may be popped up on a video playback screen for playback of the video, an e-mail reception notification screen for notification of reception of an incoming e-mail.

Through the above series of processes, when the vehicle navigation apparatus 2 determines that the battery level threshold reach time is prior to the destination arrival time, e.g., when the vehicle navigation apparatus 2 determines that the battery level (the remaining battery level) of the battery 34 is to reach below threshold at the time when the passenger stops driving and gets out of the vehicle, the vehicle navigation apparatus 2 notifies the passenger of the prompt battery charge information to prompt the passenger to charge the battery 34. In the above, the battery level threshold reach time is a time when the battery level (the remaining battery level) of the battery 34, which serves as the power source for operation of the cellular phone 3, reaches below the threshold.

In the above-described configuration of the in-vehicle communication system 1, the cellular phone 3 transmits the information on the device state and the battery level to the vehicle navigation apparatus 2; then, based on the transmitted information on the device state and the battery level of the cellular phone 3, the vehicle navigation apparatus 2 predicts the battery level threshold reach time, which is the time when the battery level of the battery 34 reaches below the threshold. Alternatively, the above in-vehicle communication system 1 may be configured such that the cellular phone 3 predicts the battery level threshold reach time and transmits the predicted battery level threshold reach time to the vehicle navigation apparatus 2. Now, this configuration will be more specifically described with reference to FIG. 4.

Figure 4:
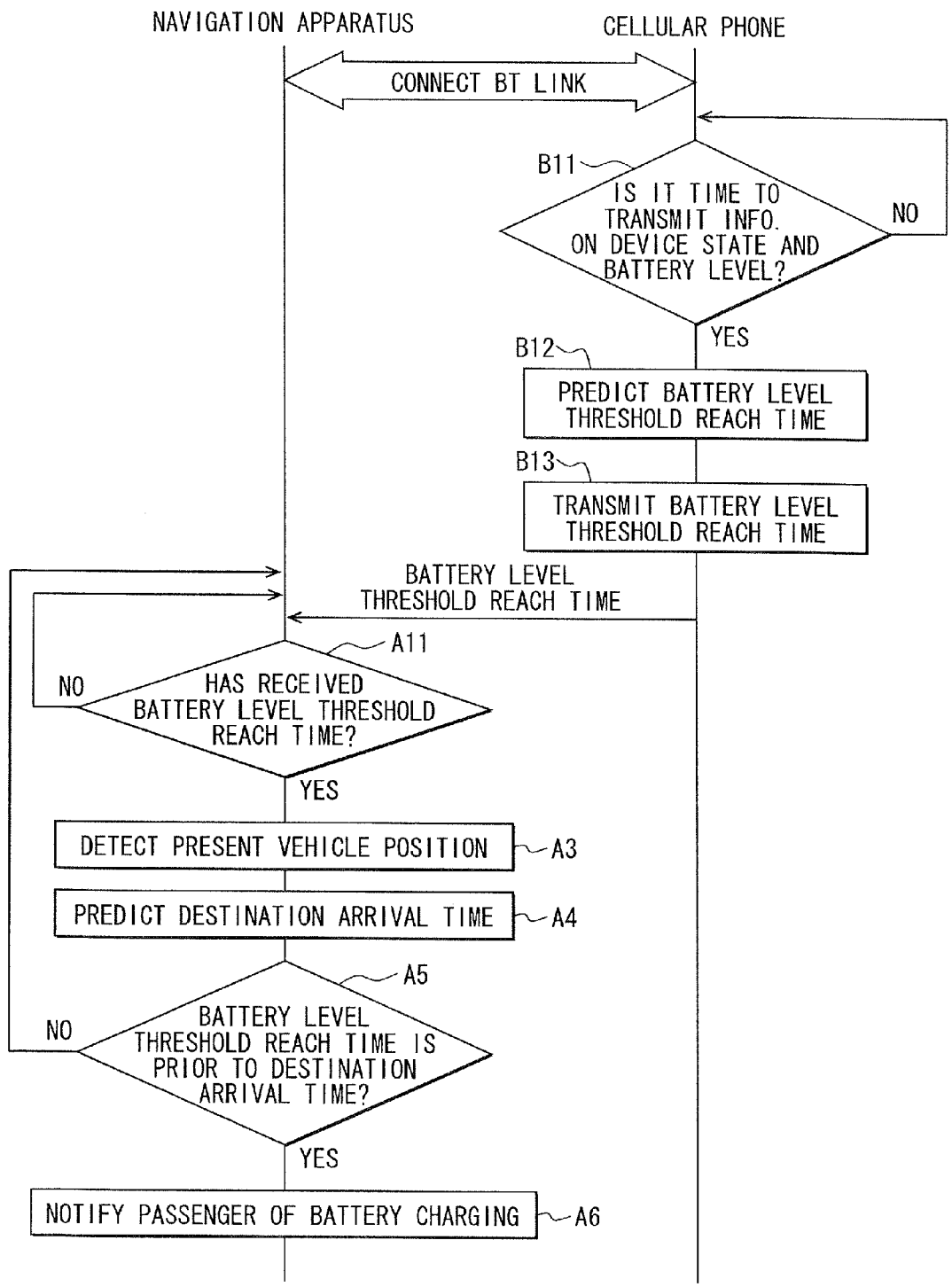
FIG. 4 is a sequence diagram illustrating a second exemplary flow of processes of a vehicle navigation apparatus and a cellular phone.
Figure 5:
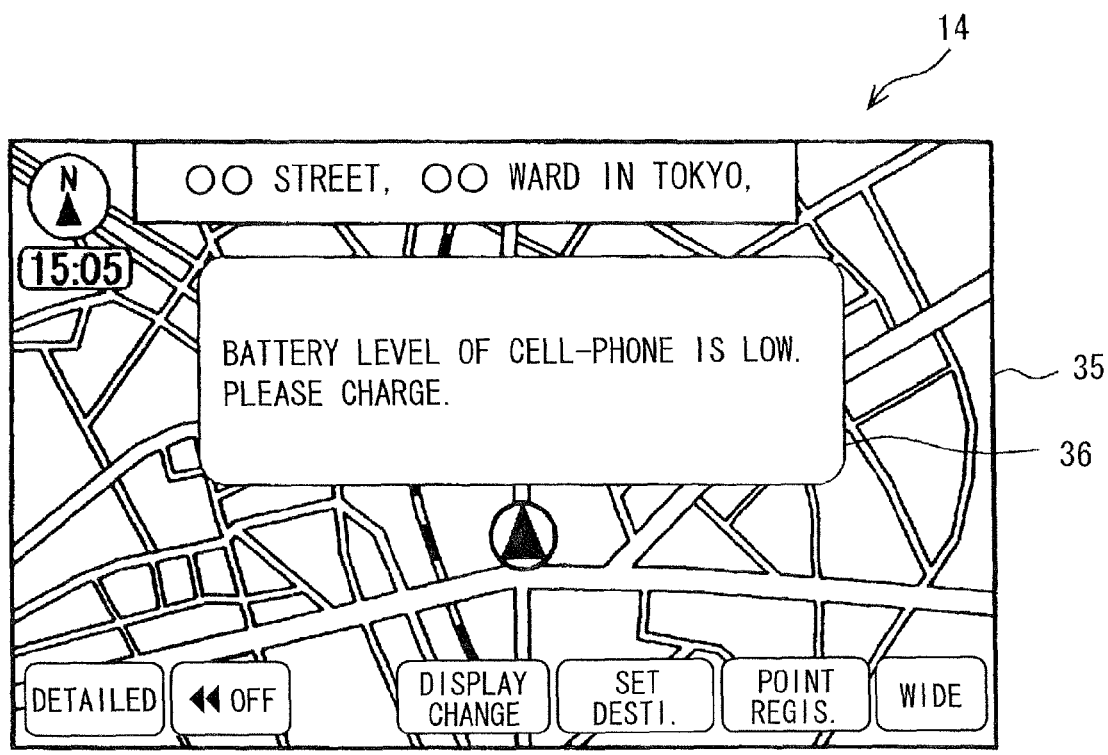
FIG. 5 is a diagram illustrating an exemplary display.

As shown in FIG. 4, when the BT communication link is established between the BT communication part 26 of the cellular phone 3 and the BT communication part 12 of the vehicle navigation apparatus 2, the cellular phone 3 performs the following. At B11, based on predetermined timing of predicting the battery level threshold reach time, the controller 24 of the cellular phone 3 determines based on the device state of the cellular phone 3 and the battery level of the battery 34 whether it is time to predict the battery level threshold reach time (the time when the battery level of the battery 34 reaches below the threshold). When the controller 24 determines that it is time to predict the battery level threshold reach time, corresponding to "YES" at B11, the process proceeds to B2. At B2, based on the battery level detection signal inputted from the battery level detector 31, the controller 24 identifies the battery level of the battery 34. At B2, in addition, based on the device state and the battery level, the controller 24 predicts the battery level threshold reach time, which is the time when the battery level of the battery 34 reaches below the threshold. At B13, the controller 24 causes the BT communication part 26 to transmit the predicted battery level threshold reach time to the vehicle navigation apparatus 2. In the above, the controller 24 may predict the battery level threshold reach time at predetermined time intervals, or alternatively, may predict the battery level threshold reach time each time when the device state is changed.

When the BT communication link is established between the BT communication part 26 of the cellular phone 3 and the BT communication part 12 of the vehicle navigation apparatus 2, the vehicle navigation apparatus 2 performs the following. At A11, the controller 7 of the vehicle navigation apparatus 2 waits for the BT communication part 12 to receive the battery level threshold reach time from the cellular phone 3. When the controller 7 of the vehicle navigation apparatus 2 determines that the BT communication part 12 has received the battery level threshold reach time from the cellular phone 3, corresponding to "YES" at A11, the controller 7 performs the above-described processes A3 to A5. When the controller 7 of the vehicle navigation apparatus 2 determines that the battery level threshold reach time is prior to the destination arrival time, e.g., when the controller 7 of the vehicle navigation apparatus 2 determines that the battery level of the battery 34 of the cellular phone 3 is to reach below the threshold or is to be insufficient at the time when the vehicle arrives at the destination, corresponding to "YES" at A5, the process proceeds to A6. At A6, the controller 7 of the vehicle navigation apparatus 2 notifies the passenger of the prompt battery charge information, which prompts the passenger to charges the battery 34.

In the above explanation, it is assumed that the destination has been set. When the destination has not been set, the following may be performed based on, for example, a past travel history. Specifically, when the vehicle travels on a route to a home, an estimated time of arrival at home may be used as a travel end time of the vehicle, which is a time when the vehicle ends traveling. Then, the battery level threshold reach time may be compared with the time of arrival at the home. When it is determined that the battery level threshold reach time is prior to the time of arrival at the home, e.g., when it is determined that the battery level of the battery 34 of the cellular phone 3 is to reach below the threshold or is to be insufficient at the time when the vehicle arrives at the home, the vehicle navigation apparatus 2 may notify the passenger of the prompt battery charge information to prompt the passenger to charge the battery 34.

As can be seen from the above, the in-vehicle communication system 1 is configured to notify the passenger of prompt charge of the battery 34 when it is determined that the battery level threshold time is prior to the destination arrival time, e.g., it is determined that the battery level threshold time is prior to a predicted time when the passenger stops driving and gets out of the vehicle, under a condition where the BT communication link is connected between the vehicle navigation apparatus 2 and the cellular phone 3. Therefore, it is possible to prevent the cellular phone 3 from being unusable at a time when the passenger gets out of the vehicle.

It is possible enhance the usability. It should be noted that the battery level threshold reach time is the time when the battery level of the battery 34 serving as the power source for operation of the cellular phone 3 reaches below the threshold. The destination arrival time is the time when the vehicle arrives at the destination. In particular, since the in-vehicle communication system 1 is configured to enable a passenger of the vehicle to control an operation of the cellular phone 3 by manipulating the vehicle navigation apparatus 2 in the case of the presence of the BT communication link between the vehicle navigation apparatus 2 and the cellular phone 3, it is conceivable that the passenger mainly manipulates the vehicle navigation apparatus 2 and rarely manipulates the cellular phone 3, and the passenger pays little attention to the battery level of the battery 34 of the cellular phone 3. In view of the above conceivable situation, there is a significant advantage to notifying the passenger of the prompt battery charge information to prompt the passenger to charge the battery 34.

The above embodiments can be modified or extended in various ways, examples of which will be described below.

As long as an in-vehicle apparatus can perform a short range wireless communication with a cellular phone, the in-vehicle apparatus is not limited to a vehicle navigation apparatus. For example, an in-vehicle apparatus having a function other than the vehicle navigation apparatus may be used. As along as a portable device can perform a short range wireless communication with an in-vehicle apparatus, the portable device is not limited to the cellular phone. For example, a portable device having a function other than the cellular phone may be used. A manner of communication between the vehicle navigation apparatus and the cellular phone is not limited to BT communication. For example, a short range wireless communication other than the BT communication may be performed.

Prompt battery charge information for prompting a passenger to charge a battery is not limited to the prompt battery charge information that is notified from the vehicle navigation apparatus. For example, the prompt battery charge information may be notified from the cellular phone, or from both of the vehicle navigation apparatus and the cellular phone. Regardless of whether a destination has been set in the vehicle navigation apparatus, the prompt battery charge information may be notified to the passenger when the battery level of the battery of the cellular phone reaches below the threshold.

As can be seen from the above, the vehicle navigation apparatus 2 can correspond to an in-vehicle apparatus. The cellular phone 3 can correspond to a portable device. The controller 7 of the vehicle navigation apparatus 2 can correspond to a battery level prediction means or component, a travel end time prediction means or component, a notification control means or component, a present position acquisition means or component, a destination setting means or component, and a destination arrival time prediction means or component. The BT communication part 12 of the vehicle navigation apparatus 2 can correspond to a reception means or component. The display device 14 of the vehicle navigation apparatus 2 can correspond to a notifier means or device. The speaker 20 can also correspond to a notifier device or notifier means. The controller 24 of the cellular phone 3 can also correspond to a battery level prediction means or component, a notification control means or component. The display device 28 and the speaker 33 of the cellular phone 3 can correspond to a notifier means or device. The BT communication part 11, 24 can correspond to a connection means or component for connecting a short range wireless communication link between an in-vehicle apparatus and a portable device such that the short range wireless communication link enables the passenger to control an operation of the portable device by manipulating the in-vehicle apparatus.

According to a first example of the present disclosure, there is provided the following in-vehicle communication system. The in-vehicle communication system is configured to connect a short range wireless communication link between an in-vehicle apparatus mounted to a vehicle and a portable device capable of being carried by a passenger of the vehicle such that the short range wireless communication link enables the passenger to control an operation of the portable device by manipulating the in-vehicle apparatus. The in-vehicle communication system includes: a battery level prediction component configured to predict a battery level threshold reach time based on a state of the portable device and a battery level of a battery serving as a power source of the portable device, the battery level threshold reach time being a time at which the battery level of the battery reaches below a threshold; a travel end time prediction component configured to predict a travel end time, the travel end time being a time at which the vehicle ends traveling; and a notification control component configured to cause a notifier device to notify the passenger of prompt battery charge information when the predicted battery level threshold reach time is prior to the predicted travel end time, the prompt battery charge information being information that prompts the passenger to charge the battery.

According to the above in-vehicle communication system, when the battery level threshold reach time is prior to the travel end time, e.g., when the battery level (battery remaining level) of the battery of the portable device is predicted to reach below the threshold at the time when the passenger ends driving and gets out of the vehicle, the in-vehicle communication system notifies the passenger of the prompt battery charge information to prompt the passenger to charge the battery. Therefore, it is possible to prevent the portable device from being unusable at the when the passenger gets out of the vehicle. It is possible to enhance usability.

Since the in-vehicle communication system is configured to enables the passenger to control an operation of the portable device by manipulation the in-vehicle device when the short range wireless communication link is established between the in-vehicle apparatus and the portable device, it is conceivable that the passenger mainly manipulates the in-vehicle apparatus and rarely manipulates the portable device, and the passenger pays little attention to the battery level of the portable device. In this relation, there is a significant advantage to notifying the passenger of the prompt battery charge information to prompt the passenger to prompt the battery.

The above in-vehicle communication system may further include: a present position acquisition component configured to acquire present position of the vehicle; a destination setting component configured to set a destination; and a destination arrival time prediction component configured to predict a destination arrival time based on the acquired present position of the vehicle and the designated destination, the destination arrival time being a time at which the vehicle arrives at the destination. The travel end time prediction component may adopt the destination arrival time as the travel end time. According to this configuration, it is possible to consider the destination arrival time as a time when the passenger stops driving and gets out of the vehicle, and it is possible to appropriately notify the passenger of information about the battery level of the battery. Therefore, it is possible to efficiently prevent the portable device from being unusable at the when the passenger gets out of the vehicle.

The above in-vehicle communication system may further include a reception component configured to receive information on the state of the portable device and the battery level of the battery, the information being transmitted from the portable device. The reception component and the battery level prediction component may be components of the in-vehicle apparatus, and the in-vehicle apparatus may receive the information on the state of the portable device and the battery level of the battery from the portable device and may predict the battery level threshold reach time based on the received information on the state of the portable device and the battery level of the battery. According to this configuration, the in-vehicle apparatus can perform processing of predicting the battery level threshold reach time based on a device state of the portable device and the battery level of the portable device. Therefore, it is possible to decrease an amount of processing in the portable device.

According to a second example of the present disclosure, there is provided an in-vehicle apparatus mountable to a vehicle and usable in an in-vehicle communication system in which the in-vehicle apparatus and a portable device capable of being carried by a passenger are connectable with each other via a short range wireless communication link such that the short range wireless communication link enables the passenger to control an operation of the portable device by manipulating the in-vehicle apparatus. The in-vehicle apparatus includes: a reception component configured to receive information on a state of the portable device and a battery level of a battery serving as a power source of the portable device, the information being transmitted from the portable device; a battery level prediction component configured to predict a battery level threshold reach time based on the information on the state of the portable device and the battery level of the battery received with the reception component, the battery level threshold reach time being a time at which the battery level of the battery reaches below a threshold; a travel end time prediction component configured to predict a travel end time, the travel end time being a time at which the vehicle ends traveling; and a notification control component configured to cause a notifier device to notify the passenger of prompt battery charge information when the predicted battery level threshold reach time is prior to the predicted travel end time, the prompt battery charge information being information that prompts the passenger to charge the battery.

According to the above in-vehicle apparatus, it is possible to provide the aforementioned advantages. For example, when it is predicted that the battery level of the battery is to reach below the threshold at a time when the passenger stops driving and gets out of the vehicle, the prompt battery charge information can be notified to the passenger. Therefore, it is possible to efficiently prevent the portable device from being unusable at the when the passenger gets out of the vehicle. It is possible to enhance usability.

The above in-vehicle apparatus may further include: a present position acquisition component configured to acquire present position of the vehicle; a destination setting component configured to designate a destination; and a destination arrival time prediction component configure to predict a destination arrival time based on the acquired present position of the vehicle and the designated destination, the destination arrival time being a time at which the vehicle arrives at the destination. The travel end time prediction component may adopt the destination arrival time as the travel end time. According to this configuration, it is possible to consider the destination arrival time as a time when the passenger stops driving and gets out of the vehicle, and it is possible to appropriately notify the passenger of information about the battery level of the battery. Therefore, it is possible to efficiently prevent the portable device from being unusable at the when the passenger gets out of the vehicle.

Additional advantages and modifications will readily occur to those skilled in the art. The invention in its broader terms is therefore not limited to the specific details, representative apparatus, and illustrative examples shown and described.

What is claimed is:

1. An in-vehicle communication system configured to connect a short range wireless communication link between an in-vehicle apparatus mounted to a vehicle and a portable device capable of being carried by a passenger of the vehicle such that the short range wireless communication link enables the passenger to control an operation of the portable device by manipulating the in-vehicle apparatus, the in-vehicle communication system comprising:

means for predicting a battery level threshold reach time based on a state of the portable device and a battery level of a battery serving as a power source of the portable device, the battery level threshold reach time being a time at which the battery level of the battery reaches below a threshold;

means for predicting a travel end time, the travel end time being a time at which the vehicle ends traveling;

means for causing a notifier device to notify the passenger of prompt battery charge information when the predicted battery level threshold reach time is prior to the predicted travel end time, the prompt battery charge information being information that prompts the passenger to charge the battery;

means for acquiring a present position of the vehicle;

destination designating means for designating a destination; and means for predicting a destination arrival time based on the acquired present position of the vehicle and the designated destination, the destination arrival time being a time at which the vehicle arrives at the destination, wherein the travel end time predicting means uses the predicted destination arrival time as the travel end time to determine whether the predicted battery level threshold reach time is prior to the travel end time when the destination is designated by the destination designating means; and the travel end time predicting means uses a time that is based on a past travel history of the vehicle as the travel end time to determine whether the predicted battery level threshold reach time is prior to the travel end time, when the destination is not designated by the destination designating means.

2. The in-vehicle communication system according to claim 1, further comprising:

means for receiving information on the state of the portable device and the battery level of the battery, the information being transmitted from the portable device, wherein:

the in-vehicle apparatus are provided with the reception means and the battery level prediction means, and the in-vehicle apparatus receives the information on the state of the portable device and the battery level of the battery from the portable device and predicts the battery level threshold reach time based on the received information on the state of the portable device and the battery level of the battery.

3. An in-vehicle apparatus mounted to a vehicle and usable in an in-vehicle communication system in which the in-vehicle apparatus and a portable device capable of being carried by a passenger are connectable with each other via a short range wireless communication link such that the short range wireless communication link enables the passenger to control an operation of the portable device by manipulating the in-vehicle apparatus, the in-vehicle apparatus comprising:

means for receiving information on a state of the portable device and a battery level of a battery serving as a power source of the portable device, the information being transmitted from the portable device;

means for predicting a battery level threshold reach time based on the information on the state of the portable device and the battery level of the battery received with the reception means, the battery level threshold reach time being a time at which the battery level of the battery reaches below a threshold;

means for predicting a travel end time, the travel end time being a time at which the vehicle ends traveling;

means for causing a notifier device to notify the passenger of prompt battery charge information when the predicted battery level threshold reach time is prior to the predicted travel end time, the prompt battery charge information being information that prompts the passenger to charge the battery;

means for acquiring a present position of the vehicle;

means for designating a destination; and means for predicting a destination arrival time based on the acquired present position of the vehicle and the designated destination, the destination arrival time being a time at which the vehicle arrives at the destination, wherein the travel end time predicting means uses the predicted destination arrival time as the travel end time to determine whether the predicted battery level threshold reach time is prior to the travel end time, when the destination is designated by the destination designating means; and the travel end time predicting means uses a time that is based on a past travel history of the vehicle as the travel end time to determine whether the predicted battery level threshold reach time is prior to the travel end, time, when the destination is not designated by the destination designating means.

4. An in-vehicle communication system for a vehicle, comprising:

a connection component configured to connect a short range wireless communication link between an in-vehicle apparatus and a portable device, such that the short range wireless communication link enables a passenger of the vehicle to control an operation of the portable device by manipulating the in-vehicle apparatus;

a battery level prediction component configured to predict a battery level threshold reach time based on a state of the portable device and a battery level of a battery of the portable device, the battery level threshold reach time being a time at which the battery level of the battery reaches below a threshold;

a travel end time prediction component configured to predict a travel end time, the travel end time being a time at which the vehicle ends traveling; a notification control component configured to cause a notifier device to notify the passenger of prompt battery charge information when the predicted battery level threshold reach time is prior to the predicted travel end time, the prompt battery charge information being information that prompts the passenger to charge the battery; a present position acquisition component configured to acquire a present position of the vehicle;

a destination setting component configured to designate a destination; and a destination arrival time prediction component configured to predict a destination arrival time based on the acquired present position of the vehicle and the designated destination, the destination arrival time being a time at which the vehicle arrives at the destination, wherein the travel end time prediction component uses the predicted destination arrival time as the travel end time to determine whether the predicted battery level threshold reach time is prior to the travel end time, when the destination is designated by the destination setting component; and the travel end time prediction component uses a time that is based on a past travel history of the vehicle as the travel end time to determine whether the predicted battery level threshold reach time is prior to the travel end time, when the destination is not designated by the destination setting component.

5. An in-vehicle apparatus mountable to a vehicle and usable in an in-vehicle communication system in which the in-vehicle apparatus and a portable device capable of being carried by a passenger are connectable with each other via a short range wireless communication link such that the short range wireless communication link enables the passenger to control an operation of the portable device by manipulating the in-vehicle apparatus, the in-vehicle apparatus comprising:

a reception component configured to receive information on a state of the portable device and a battery level of a battery of the portable device, the information being transmitted from the portable device;

a battery level prediction component configured to predict a battery level threshold reach time based on the information on the state of the portable device and the battery level of the battery received with the reception component, the battery level threshold reach time being a time at which the battery level of the battery reaches below a threshold;

a travel end time prediction component configured to predict a travel end time, the travel end time being a time at which the vehicle ends traveling;

a notification control component configured to cause a notifier device to notify the passenger of prompt battery charge information when the predicted battery level threshold reach time is prior to the predicted travel end time, the prompt battery charge information being information that prompts the passenger to charge the battery;

a present position acquisition component configured to acquire a present position of the vehicle;

a destination setting component configured to designate a destination; and a destination arrival time prediction component configured to predict a destination arrival time based on the acquired present position of the vehicle and the designated destination, the destination arrival time being a time at which the vehicle arrives at the destination, wherein the travel end time prediction component uses the predicted destination arrival time as the travel end time to determine whether the predicted battery level threshold reach time is prior to the travel end time, when the destination is designated by the destination setting component and the travel end time prediction component uses a time that is based on a past travel history of the vehicle as the travel end time to determine whether the predicted battery level threshold reach time is prior to the travel end time, when the destination is not designated by the destination setting component.

6. The in-vehicle communication system of claim 1, wherein the in-vehicle apparatus is a vehicle navigation apparatus, the portable device is a cellular phone, and the vehicle navigation apparatus is configured to enable the passenger of the vehicle to control operation of the cellular phone via short range wireless communication link.

7. The in-vehicle communication system of claim 1, wherein the past travel history uses an estimated time of arrival at home as the travel end time, when the vehicle travels on a route to the home and the destination is not designated.

8. The in-vehicle apparatus of claim 3, wherein the in-vehicle apparatus is a vehicle navigation apparatus, the portable device is a cellular phone, and the vehicle navigation apparatus is configured to enable the passenger of the vehicle to control operation of the cellular phone via short range wireless communication link.

9. The in-vehicle apparatus of claim 3, wherein the past travel history uses an estimated time of arrival at home as the travel end time, when the vehicle travels on a route to the home and the destination is not designated.

10. The in-vehicle communication system of claim 4, wherein the in-vehicle apparatus is a vehicle navigation apparatus, the portable device is a cellular phone, and the vehicle navigation apparatus is configured to enable the passenger of the vehicle to control operation of the cellular phone via the short range wireless communication link.

11. The in-vehicle communication system of claim 4, wherein the past travel history uses an estimated time of arrival at home as the travel end time, when the vehicle travels on a route to the home and the destination is not designated.

12. The in-vehicle communication system of claim 5, wherein the in-vehicle apparatus is a vehicle navigation apparatus, the portable device is a cellular phone, and the vehicle navigation apparatus is configured to enable the passenger of the vehicle to control operation of the cellular phone via the short range wireless communication link.

13. The in-vehicle communication system of claim 5, wherein the past travel history uses an estimated time of arrival at home as the travel end time, when the vehicle travels on a route to the home and the destination is not designated.

* * * * *